(12) United States Patent
Kwon

(10) Patent No.: US 9,515,519 B2
(45) Date of Patent: Dec. 6, 2016

(54) ELECTRIC LAMP APPARATUS WITH EMERGENCY LIGHT

(71) Applicant: Ig Soo Kwon, San Ramon, CA (US)

(72) Inventor: Ig Soo Kwon, San Ramon, CA (US)

( * ) Notice: Subject to any disclaimer, the term of this patent is extended or adjusted under 35 U.S.C. 154(b) by 0 days.

(21) Appl. No.: 14/973,736

(22) Filed: Dec. 18, 2015

(65) Prior Publication Data
US 2016/0211699 A1   Jul. 21, 2016

(30) Foreign Application Priority Data
Jan. 15, 2015  (KR) .......................... 10-2015-0007164

(51) Int. Cl.
  *H05B 37/00*  (2006.01)
  *H02J 9/06*  (2006.01)
  *H05B 33/08*  (2006.01)

(52) U.S. Cl.
  CPC ........... *H02J 9/061* (2013.01); *H05B 33/0845* (2013.01); *H05B 33/0884* (2013.01)

(58) Field of Classification Search
  CPC ............ H05B 37/0272; H05B 37/0227; H05B 33/0854; H05B 33/0803; H05B 33/0845; H05B 37/03; H05B 33/0815; H05B 33/0809; H05B 33/0842; H05B 33/089; H05B 37/0281; H05B 41/2853; H05B 33/0806; F21S 9/02
  See application file for complete search history.

(56) References Cited

U.S. PATENT DOCUMENTS

2011/0141153 A1*  6/2011  Lee ...................... G09G 3/3614
                                                    345/690

* cited by examiner

*Primary Examiner* — Douglas W Owens
*Assistant Examiner* — Monica C King
(74) *Attorney, Agent, or Firm* — Revolution IP, PLLC

(57) ABSTRACT

Disclosed is an electric lamp apparatus, and more particularly to an electric lamp apparatus, in which an electric lamp is configured to emit light with power charged in a battery when power is shut down, so that the electric lamp can be used as an emergency light and no additional work is separately needed for constructing the emergency light, thereby reducing costs, time and effort to be taken in constructing the emergency light.

6 Claims, 2 Drawing Sheets

ELECTRIC LAMP APPARATUS WITH EMERGENCY LIGHT

CROSS-REFERENCE TO RELATED APPLICATION

This application claims priority from Korean Patent Application No. 10-2015-0007164, filed on Jan. 15, 2015 in the Korean Intellectual Property Office, the disclosure of which is incorporated herein by reference.

BACKGROUND OF THE INVENTION (a) Field of the Invention

The present invention relates to an electric lamp apparatus, and more particularly to an electric lamp apparatus with an emergency light, in which the electric lamp apparatus can be used as an emergency light.

(b) Description of the Related Art

In general, an emergency power-surge detector or an emergency light, which operates at power shutdown, can be used only while it is connected to a continuous power supply.

Therefore, equipment work is needed for additionally installing the emergency light in a private house, a business store or the like. However, it requires unnecessary costs, effort and time if the emergency light is constructed by the additional equipment work.

SUMMARY OF THE INVENTION

Accordingly, the present invention is conceived to solve the foregoing problems, and an aspect of the present invention is to provide an electric lamp apparatus with an emergency light, in which an electric lamp is configured to receive charged power from a battery and emit light when power is shut down, so that the electric lamp can be used as an emergency light, and no additional work is separately needed for constructing the emergency light, thereby reducing costs, time and effort to be taken in constructing the emergency light.

In accordance with an embodiment of the present invention, there is provided an electric lamp apparatus with an emergency light, comprising an electric lamp module configured to comprise a power supply that supplies commercial power, a first converter that converts alternating current (AC) power supplied from the power supply into direct current (DC) power, a first switch that is turned on to pass the DC power output from the first converter in response to a first enable signal, and an electric lamp that emits light with the DC power supplied passing through the first switch; and an emergency light module configured to apply the first enable signal to the first switch when the power supply normally supplies the commercial power, and turns off the first switch and at the same time use a battery to make the electric lamp function as the emergency light when power shutdown occurs in the power supply.

The emergency light module may comprise a shutdown sensor that senses the power shutdown; a pulse generator that generates a pulse signal different in a frequency band from the commercial power when the power shutdown is sensed; a rectifier that rectifies the pulse signal, a filter that passes the rectified pulse signal; a second converter that converts the pulse signal passed through the filter into a DC signal; a level sensor that operates in response to the DC signal output from the second converter and generates a first disable signal for turning off the first switch and at the same time generates a second enable signal; a booster that boosts charged power of the battery up to an electric-lamp driving voltage as the level sensor operates; and a second switch that is turned on to supply the boosted power to the electric lamp in response to the second enable signal.

If the power supply normally supplies the commercial power, the rectifier rectifies the commercial power, the filter filters off the rectified commercial power, the second converter outputs no signals for operating the level sensor, and the level sensor applies the first enable signal to the first switch and at the same time applies the second disable signal to the second switch.

The pulse signal may comprise a high frequency signal that has a higher frequency than the commercial power, and the filter may comprise a high-pass-filter that filters off a frequency signal of the commercial power but passes a frequency signal of the pulse signal.

The pulse signal may have an amplitude different from the amplitude of the commercial power, and the filter may filter off the amplitude of the commercial power but passes the amplitude of the pulse signal.

The emergency light module may comprise a shutdown sensor that senses the power shutdown, a wireless signal transmitter that generates a short-range wireless signal when the power shutdown is sensed, a wireless signal receiver that receives the short-range wireless signal and operates to generate a first disable signal for turning off the first switch and at the same time generate a second enable signal, a booster that boosts charged power of the battery to an electric-lamp driving voltage as the wireless signal receiver operates, and a second switch that is turned on to supply the boosted power to the electric lamp in response to the second enable signal.

If the power supply normally supplies the commercial power, the wireless signal receiver applies the first enable signal to the first switch and at the same time applies a second disable signal to the second switch.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
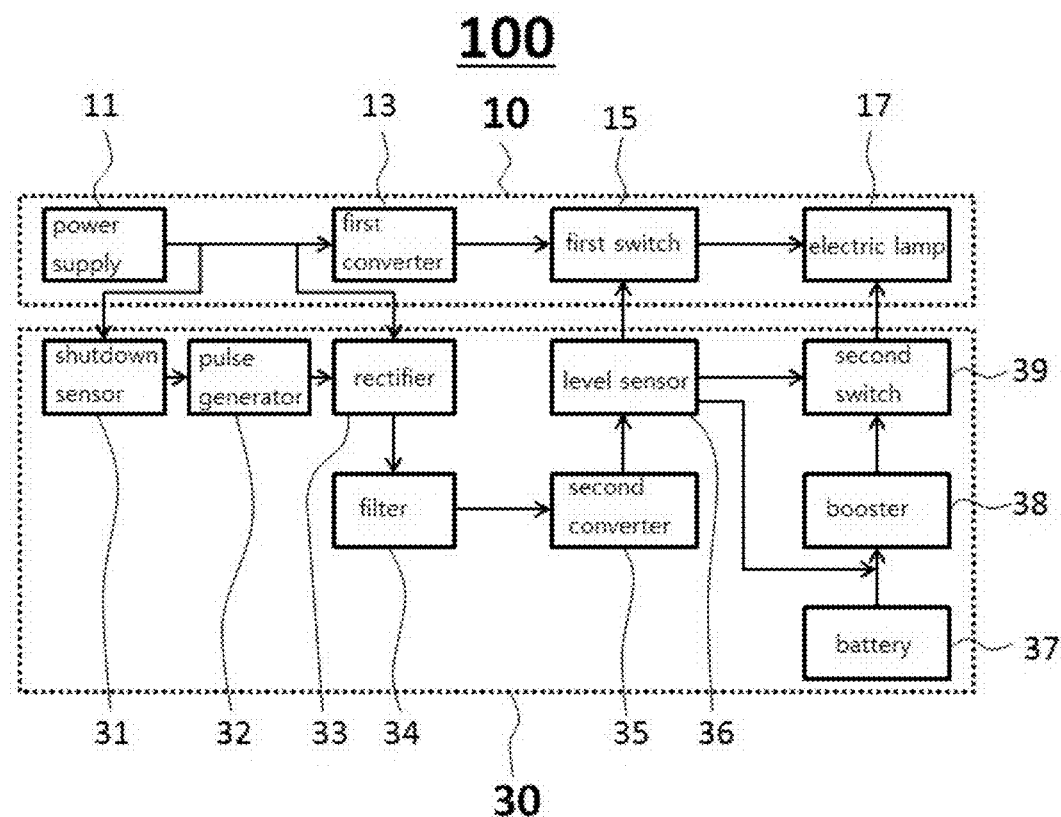
FIG. 1 is a block diagram of an electric lamp apparatus with an emergency light according to a first embodiment of the present invention.

Regarding the foregoing problems, solutions and effects, exemplary embodiments of an electric lamp apparatus with an emergency light according to the present invention will be described below with reference to the accompanying drawings.

For clarity and convenience of description, the size, shape, etc. of the elements may be exaggerated in the drawings. Further, terms specially defined in consideration of the structure and function of the elements may be varied depending on intention or custom of a user and operator.

FIG. 1 is a block diagram of an electric lamp apparatus 100 with an emergency light according to an embodiment of the present invention.

As shown in FIG. 1, the electric lamp apparatus 100 functioned as the emergency light according to this embodiment is configured to include an electric lamp module 10 for serving as an electric lamp while power is normally supplied, and an emergency light module 30 for serving as an emergency light while power is abnormally supplied, i.e. while power is shut down.

The electric lamp module 10 turns on or off an electric lamp 17 when commercial power is normally supplied and cut off.

Specifically, the electric lamp module 10 includes a power supply 11 for that supplies commercial power, a first converter 13 that converts alternating current (AC) power supplied from the power supply 11 into direct current (DC) power, a first switch 15 that passes the DC power to be supplied from the first converter 13 in response to a first enable signal, and an electric lamp 17 that emits light with the DC power supplied via the first switch.

The power supply 11 supplies the commercial power, i.e. power of AC 220V, which has a frequency of 60 Hz. The commercial power of AC 220V and 60 Hz is converted into a DC voltage by the first converter 13 and then supplied to the electric lamp 17.

The first converter 13 is an AC/DC converter that converts a voltage of AC 220V into a DC voltage for driving the electric lamp. For example, if the electric lamp 17 is made of a light emitting diode (LED) and driven at a voltage of DC 18V, the AC/DC converter, i.e. The first converter 13 converts 220V AC power into 18V DC power.

The DC power output from the first converter 13 is supplied to the electric lamp 17 via the first switch 15 so that the LED of the electric lamp 17 can emit light. The first switch 15 makes the DC power output from the first converter be supplied or cut off. That is, when the first switch 15 is turned on, the DC power is supplied to the electric lamp 17 so that the LED can emit light. When the first switch 15 is turned off, the DC power is cut off and not supplied to the electric lamp 17 so that the LEDs of the electric lamp 17 cannot emit light.

Specifically, the first switch 15 is made of a transistor that is turned on to supply the DC power to the electric lamp 17 when the first enable signal is applied to a base of the transistor, and turned off not to supply the DC power to the electric lamp 17 when the first enable signal is not applied, i.e. when a first disable signal is applied.

In brief, the first switch 15 is turned on in response to the first enable signal to pass the DC power output from the first converter 13, and turned off in response to the first disable signal to cut off a signal output from the first converter 13.

The electric lamp 17 emits light by receiving the DC power, e.g., DC 18V from the first switch 15. The electric lamp 17 may be an LED electric lamp device where LEDs are connected in series or parallel. Alternatively, various electric lamp devices, which can be driven by the DC power, may be employed as the electric lamp 17.

With this configuration, the electric lamp module 10 operates to make the electric lamp 17 emit light while the power is supplied normally. By the way, the power may be supplied abnormally due to various reasons such as power shutdown, etc. For example, the power shutdown may cause the power to be not normally supplied.

Like this, if the power is not normally supplied by the power shutdown or the like, a route of the electric lamp module is cut off to prevent the electric lamp 17 from damage due to a surge and at the same time the electric lamp 17 serves as the emergency light so as to easily provide against emergencies.

Accordingly, the electric lamp apparatus 100 functioned as the emergency light according to the present invention includes the emergency light module 30. The emergency light module 30 generates the first enable signal to be continuously applied to the first switch 15 in order to keep the first switch 15 turned on when the commercial power is normally supplied, but turns off the first switch 15 to make the electric lamp 17 function as the emergency light when the commercial power is not normally supplied, i.e. when the power shutdown occurs.

Specifically, the emergency light module 30 applies the first enable signal to the first switch 15 when the power supply 11 normally supplies the commercial power, but turns off the first switch 15 and at the same time makes the electric lamp 17 receive power from a battery and function as the emergency light when the power shutdown occurs in the power supply 11.

That is, the emergency light module 30 generates and applies the first enable signal to the first switch 15 when the power supply 11 normally supplies the commercial power, so that the commercial power can be converted into the DC power by the first converter 13 and the DC power can be supplied to the electric lamp 17 via the first switch 15, thereby making the electric lamp 17 emit light normally.

Further, the emergency light module 30 generates and applies the first disable signal to the first switch 15 when the power shutdown or the like causes the power supply 11 not to normally supply the commercial power, so that the first switch 15 can be turned off. That is, if the power shutdown is sensed, the emergency light module 30 applies the first disable signal to the first switch 15 so that the first switch 15 can be turned off.

In addition, the emergency light module 30 drives the electric lamp 17 to function as the emergency light when the electric lamp 17 does not operate as a normal electric lamp. That is, when power is not normally supplied from the power supply 11 due to the power shutdown or the like, the emergency light module 30 drives the electric lamp 17 to receive charged power from the battery and function as the emergency light, and details of which will be described below.

As shown in FIG. 1, the emergency light module 30 includes a shutdown sensor 31 that senses the power shutdown; a pulse generator 32 that generates a pulse signal different from a frequency band from the commercial power when the power shutdown is sensed; a rectifier 33 rectifies the pulse signal; a filter 34 that passes the rectified pulse signal; a second converter 35 that converts the pulse signal passed through the filter 34 into a DC signal; a level sensor 36 that operates in response to the DC signal output from the second converter 35 to generate the first disable signal for turning off the first switch 15 and at the same time generate a second enable signal; a booster 38 that boosts up the power charged in a battery 37 to an electric-lamp driving voltage as the level sensor 36 operates, and a second switch 39 that is turned on in response to the second enable signal and supplies the boosted-up charged power to the electric lamp 17.

The shutdown sensor 31 is interposed in between the power supply 11 and the first converter 13 and senses the power shutdown. Further, the shutdown sensor 31 may sense a surge signal caused by a short circuit or the like. When the shutdown sensor 31 senses the power shutdown, the power short-circuit or the like, the pulse generator 32 is enabled to generate the pulse signal.

The pulse generator 32 generates the pulse signal and outputs it to the rectifier 33 when the shutdown sensor 31 senses the power shutdown. The pulse signal generated by the pulse generator 32 is different in a frequency band from the commercial power.

For example, the pulse signal has a higher frequency than the commercial power, i.e. 100 KHz, and a level of 0V~18V.

As described above, the pulse signal having a higher frequency than the commercial power is supplied to the rectifier 33, and the rectified signal is then supplied to the filter 34. That is, the pulse signal rectified by and output from the rectifier 33 is supplied to and passes the filter 34. In other words, the filter 34 does not filter off but passes the rectified pulse signal. On the other hand, the filter 34 passes the pulse signal but filters off the commercial power having a lower frequency than the pulse signal, which will be described later. Therefore, the filter 34 may be a high-pass filter (HPF) that filters off the commercial power signal having a relatively low frequency but passes the pulse signal having a relatively high frequency.

The pulse signal passed through the filter 34 is converted into the DC signal by the second converter 35. For example, the pulse signal input to the second converter 35 is an AC signal having a level of 0V~18V, and this signal is converted into a DC signal having a level of 9V by the second converter 35.

The DC signal (for example, DC 9V) converted by and output from the second converter 35 is applied to the level sensor 36. The level sensor 36 operates with the DC signal output from the second converter 35, and generates the first disable signal for turning off the first switch 15 and at the same time generates the second enable signal for turning on the second switch 39 (to be described later).

Specifically, the level sensor 36 may operate in response to the DC signal output from the second converter 35. For example, the level sensor 36 is driven by a 9V DC signal to generate the first disable signal and at the same time generates the second enable signal.

If the level sensor 36 is not driven by the DC signal (e.g., DC 9V) output from the second converter, i.e. if the level sensor 36 receives no signal (e.g., 0V), the first disable signal is not generated and the first enable signal continuously keeps the first switch 15 turned on.

Specifically, if the DC signal of 9V is not input to the level sensor 36, there is no change in the operation of the first switch 15. In other words, the first disable signal for turning off the first switch 15 is not generated. Therefore, the first switch 15 is continuously kept turned on.

Like this, the level sensor 36 is driven in response to the DC signal of about 9V to turn off the first switch 15, thereby cutting off the route of the electric lamp module 10. Therefore, the electric lamp 17 is protected by a surge current or the like.

If the first switch 15 is turned off by the level sensor 36, the electric lamp 17 is turned off and functions as the emergency light. To this end, the level sensor 36 applies the second enable signal to the second switch 38 that is turned on so that the power charged in the battery 37 can be supplied to the electric lamp 17.

That is, the level sensor 36 generates the second enable signal when the power shutdown occurs, and applies it to the second switch 39. Then, the charged power input to the second switch 39 is supplied to the electric lamp 17, so that the electric lamp 17 can function as the emergency light.

The battery 37 is a rechargeable battery that is connectable to the power supply 11 so as to be charged while the commercial power is normally supplied. Alternatively, the battery 37 may be previously charged by a separate power supply, or may be a separate battery that has already been fully charged.

The power charged in the battery 37 has a voltage that is below the electric-lamp driving voltage of the electric lamp 17. Accordingly, there is provided a booster that is interposed in between the battery 37 and the second switch 39 and boosts the charged power up to the electric-lamp driving voltage When the level sensor 36 is driven to operate, the booster 38 boosts the voltage of the charged power output from the battery 37 up to a voltage for driving the electric lamp 17, i.e. the electric-lamp driving voltage under control of the level sensor 36.

Then, the boosted power is supplied to the electric lamp 17 via the second switch 39. The second switch 39 is turned on in response to the second enable signal generated by the level sensor 36, and supplies the boosted power, i.e. the charged power having the electric-lamp driving voltage to the electric lamp 17.

The power charged in the battery 37 has a voltage of about 3.7V, and the booster 38 boosts the charged power having a voltage of 3.7V up to about 18V corresponding to the electric-lamp driving voltage and outputs the boosted power to the second switch 39. Then, the second switch 39 supplies the boosted power having the electric-lamp driving voltage to the electric lamp 17 so that the electric lamp 17 can function as the emergency light.

Like this, the electric lamp apparatus 100 functioned as the emergency light according to the present invention, which includes the electric lamp module 10 and the emergency light module 30, functions as an ordinary electric lamp while the commercial power is normally supplied, but cuts off the route of the electric lamp module 10 to not only protect the electric lamp but also operate the electric lamp with the previously charged power so that the electric lamp can function as the emergency light if it is sensed that the power shutdown or the power short-circuit occurs, i.e. that the commercial power is not normally supplied.

Here, if the shutdown sensor 31 senses the power shutdown or the power short-circuit, the pulse generator 32 generates a pulse signal having a higher frequency than the commercial power.

That is, the pulse signal generated by the pulse generator 32 is a frequency higher than that of the commercial power. For instance, the pulse signal may have a high frequency, i.e. about 100 KHz higher than 60 Hz of the commercial power.

By the way, as described above, the filter 34 has to pass a signal for enabling the level sensor 36, i.e. a signal converted by the second converter 35 into the DC signal and applied to the level sensor 36 when it is sensed that the power shutdown or the like occurs.

On the other hand, the filter 34 has to filter off a signal for disabling the level sensor 36, i.e. a signal converted by the second converter 35 into the DC signal and applied to the level sensor 36 if the commercial power is normally supplied. In this case, the level sensor 36 does not operate and thus the first switch 15 is kept turned on as described above.

Like this, the filter 34 may be the high-pass filter (HPF) that filters off the frequency signal of the commercial power but passes the frequency signal of the pulse signal.

For example, if the pulse signal generated by the pulse generator has a frequency of 100 KHz, the filter 34 may be the high-pass filter that passes only the signal of about 50 KHz or higher.

The pulse signal generated at the power shutdown or the power short-circuit passes through the filter 34 and is then converted by the second converter 35 into the DC signal, thereby driving the level sensor 36. Thus, the level sensor 36 generates the first disable signal, thereby turning off the first switch 15.

While the commercial power is normally supplied, the pulse generator 32 does not generate the pulse signal. In this case, the commercial power is rectified by the rectifier 33 connected in between the power supply and the first converter. That is, the commercial power of 60 Hz and AC 220V is changed into a signal of 120 Hz and 110V while passing through the rectifier 33.

The rectified signal is input to the filter 34. Since the filter 34 is the high-pass filter of passing only the high frequency signal, i.e. passing only a frequency signal of 50 KHz or higher, the commercial power signal is filtered off. Therefore, the filter 34 outputs a 0V signal, i.e. no signals.

In result, the level sensor 36 does not operate since the second converter 35 outputs no signals, i.e. the 0V signal. Therefore, the level sensor 36 does not operate while the commercial power is normally supplied, and thus the first switch 15 is kept turned on without being turned off in response to the first disable signal.

The foregoing filter 34 refers to an extended concept of a general filter such as a high-pass filter (HPF) that passes only a certain frequency or higher, a low-pass filter (LPF) that passes only a certain frequency or lower, etc. That is, the filter 34 may serve to pass only a signal having an amplitude higher than a certain amplitude or only a signal having an amplitude lower than a certain amplitude.

Thus, the pulse signal rectified by the rectifier 33 has an amplitude different from the amplitude of the commercial power, i.e. the amplitude of the commercial power passed through the rectifier 33, and the filter 34 filters off the amplitude of the commercial power but passes the amplitude of the pulse signal.

For example, the filter 34 may be configured to filter off a signal having an amplitude of 110V or higher but pass a signal having an amplitude lower than 110V. That is, the filter 34 filters off the commercial power rectified by the rectifier 33, but passes the pulse signal generated by the pulse generator and rectified by the rectifier. For this operation, the filter may be variously achieved by a circuit, a device, etc. The filter 34 may be achieved by one of them.

Since the commercial power is a signal of 60 Hz and AC 220V, it is changed into a signal of 120 Hz and 110V while passing through the rectifier. Therefore, the commercial power rectified by the rectifier is cut off by the filter that filters off the signal having the amplitude of 110V or higher.

On the other hand, the signal generated in the pulse generator is a signal of 18V, and the pulse signal passed through the rectifier has an amplitude of 18V. Therefore, the pulse signal rectified by the rectifier can pass the filter that filters off only the signal having the amplitude of 110V or higher.

When the commercial power is input to the filter, the filter 34 filters off all the rectified commercial power signal since it is capable of filtering off the amplitude of the commercial power. Thus, the filter 34 outputs a 0V signal, i.e. no signals.

In result, the level sensor 36 does not operate since the second converter 35 outputs no signals, i.e. a 0V signal. In other words, the level sensor 36 does not operate while the commercial power is normally supplied, and thus the first switch 15 is not turned off by the first disable signal but kept turned on by the first enable signal.

As described above, the electric lamp apparatus according to the present invention can be advantageously functioned as the emergency light by cutting off a path (route), where the commercial power is normally supplied, when the power is shut down, and at the same time driving the electric lamp made of the LED with the power previously charged in the battery.

This operation may be achieved as described above in such a manner that the pulse generator 32 generates the pulse signal when the power shutdown is sensed, and the level sensor 36 operates in response to the generated pulse signal. In result, the level sensor is driven by the pulse signal generated in the pulse generator, thereby performing a function of the emergency light.

By the way, the function of the emergency light may be fulfilled by a configuration different from the emergency light module of FIG. 1 including the pulse generator, the level sensor, etc.

On the contrary to the emergency light module 30 shown in FIG. 1, the emergency light module 30 may be configured to include a shutdown sensor 31, a wireless signal generator 41, a wireless signal receiver 43, a battery 37, a booster 38 and a second switch 39.

Specifically, the emergency light module 30 includes a shutdown sensor 31 that senses the power shutdown; the wireless signal transmitter 41 that generates a short-range wireless signal when the power shutdown is sensed; the wireless signal receiver 43 that receives the short-range wireless signal and operates to generate the first disable signal for turning off the first switch 15 and at the same time generate the second enable signal; the booster 38 that boosts the power charged in the battery 37 up to the electric-lamp driving voltage as the wireless signal receiver 43 operates; and the second switch 39 that is turned on by the second enable signal so that the boosted power can be supplied to the electric lamp.

Figure 2:
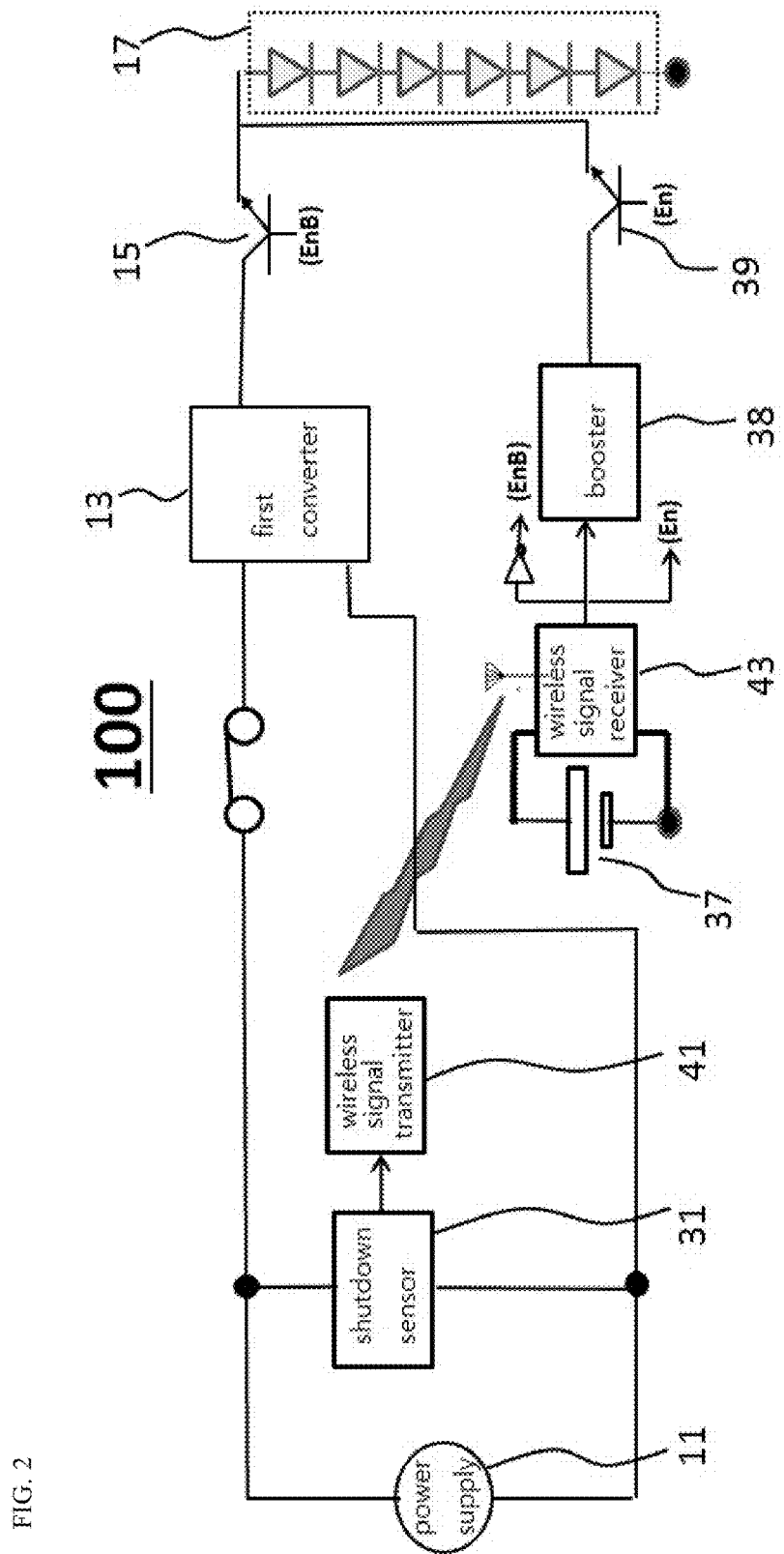
FIG. 2 is a circuit diagram of an electric lamp apparatus with an emergency light according to a second embodiment of the present invention.

With this configuration as shown in FIG. 2, the emergency light module 30 included in the electric lamp apparatus 100 functioned as the emergency light include not the pulse generator, the rectifier, the filter, the second converter and the level sensor but the wireless signal transmitter 41 and the wireless signal receiver 43 on the contrary to the emergency light module shown in FIG. 1.

The shutdown sensor 31, the battery 37, the booster 38 and the second switch 39 of FIG. 2 have the same operations and functions as the shutdown sensor 31, the battery 37, the booster 38 and the second switch 39 of FIG. 1. However, the second switch 39 of FIG. 2 is turned on by not the second enable signal generated in the level sensor 36 but the second enable signal generated in the wireless signal receiver 43.

Specifically, when the shutdown sensor 31 senses the power shutdown or the power short-circuit, the shutdown sensor 31 enables the wireless signal transmitter 41. Then, the wireless signal transmitter 41 generates a predetermined short-range wireless signal and transmits it wirelessly.

The short-range wireless signal transmitted from the wireless signal transmitter 41 is received in the wireless signal receiver 43. Then, the wireless signal transmitter 41 performs the same operations as the level sensor 36 of FIG. 1.

That is, the first disable signal for turning off the first switch 15 is generated so as to cut off the route of the electric lamp module 10, and at the same time the second enable signal is generated in order to turn on the second switch 39.

Then, the power charged in the battery 37 is boosted up to the electric-lamp driving voltage through the booster 38, and then supplied to the electric lamp 17 through the second switch 39. Therefore, the electric lamp can function as the emergency light.

The wireless signal transmitter 41 and the wireless signal receiver 43 may be respectively achieved by a radio frequency identification (RFID) transmitter and receiver, a radio frequency integrated circuit (RFIC) transmitter and receiver, or a wireless fidelity (WiFi) transmitter and receiver.

By the way, in FIG. 2, if the power supply 11 normally supplies the commercial power, the wireless signal receiver 43 applies the first enable signal to the first switch 15 and at the same time applies the second disable signal to the second switch 39. That is, in FIG. 2, if the power supply normally supplies the commercial power, the first switch continuously receives the first enable signal so that the electric lamp can function as the electric lamp with the commercial power, and at the same time the second switch receives the second disable signal prevents the charged power of the battery from being applied to the electric lamp That is, the wireless signal receiver 43 performs the same operations as those of the case where the level sensor of FIG. 1 operates, while receiving the short-range wireless signal from the wireless signal transmitter 41, and performs the same operations as those of the case where the level sensor of FIG. 1 does not operate (i.e. where the corner power is normally supplied), while receiving no short-range wireless signal from the wireless signal transmitter 41 (i.e. the commercial power is normally supplied).

In an electric lamp apparatus with an emergency light according to the present invention, an electric lamp is configured to receive charged power from a battery and emit light when power is shut down, so that the electric lamp can be used as an emergency light, and no additional work is separately needed for constructing the emergency light, thereby reducing costs, time and effort to be taken in constructing the emergency light.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An electric lamp apparatus with an emergency light, comprising:
   a first module comprises a power supply that supplies commercial power, the first module includes;
   a first converter that converts alternating current (AC) power supplied from the power supply into direct current (DC) power;
   in response to detection of a first enable signal, a first switch that is turned on to pass the DC power output from the first converter, the DC power being supplied to an electric lamp via the first switch;
   an electric lamp that emits light with the DC power supplied passing through the first switch; and
   a second module configured to apply the first enable signal to the first switch in order to keep the first switch turned on in response to detection of the power supply normally supplies the commercial power, and in response to detection of power shutdown, turns off the first switch and to receive power from a battery to make the electric lamp function as the emergency light when power shutdown occurs in the power supply, wherein the second module is an emergency light module, the second module further comprises:
   a shutdown sensor detects the power shutdown,
   in response to detection of the power shutdown, a pulse generator generates a pulse signal different in a frequency band from a frequency band of the commercial power,
   a rectifier rectifies the pulse signal,
   a filter passes the rectified pulse signal,
   a second converter converts the pulse signal passed through the filter into a DC signal,
   in response to detection of the power shutdown, a level sensor generates a first disable signal for turning off the first switch and generates a second enable signal for turning on a second switch,
   a booster boosts charged power of the battery up to an electric-lamp driving voltage as the level sensor operates; and
   the second switch is turned on to supply the boosted power to the electric lamp in response to detection of the second enable signal.

2. The electric lamp apparatus with an emergency light according to claim 1, wherein
   in response to detection of the power supply normally supplies the commercial power, the rectifier rectifies the commercial power, the filter filters off the rectified commercial power, the second converter outputs no signals for operating the level sensor, and the level sensor applies the first enable signal to the first switch and applies the second disable signal to the second switch.

3. The electric lamp apparatus with an emergency light according to claim 2, wherein the pulse signal comprises a high frequency signal that has a higher frequency than a frequency signal of the commercial power, and the filter comprises a high-pass-filter that filters off the frequency signal of the commercial power but passes the high frequency signal of the pulse signal.

4. The electric lamp apparatus with an emergency light according to claim 2, wherein the pulse signal has an amplitude different from the amplitude of the commercial power, and the filter filters off the amplitude of the commercial power but passes the amplitude of the pulse signal.

5. The electric lamp apparatus with an emergency light according to claim 1, wherein the second module alternatively comprises:
   a shutdown sensor that senses the power shutdown;
   a wireless signal transmitter generates a short-range wireless signal in response to detection of the power shutdown;
   a wireless signal receiver receives the short-range wireless signal and operates to generate a first disable signal for turning off the first switch and generate a second enable signal;
   a booster boosts charged power of the battery to an electric-lamp driving voltage as the wireless signal receiver operates; and
   a second switch is turned on to supply the boosted power to the electric lamp in response to detection of the second enable signal.

6. The electric lamp apparatus with an emergency light according to claim 5, wherein in response to detection of the power supply that normally supplies the commercial power, the wireless signal receiver applies the first enable signal to the first switch and applies a second disable signal to the second switch, wherein
   the first switch continuously receives the first enable signal so that the electric lamp can function as the electric lamp with the commercial power, and the second switch receives the second disable signal that prevents the charged power of the battery from being applied to the electric lamp.

\* \* \* \* \*